United States Patent Office 3,377,333
Patented Apr. 9, 1968

3,377,333
METHOD OF BLEACHING AND STABILIZATION OF TALL OIL DURING DISTILLATION THEREOF
Leo Frank Ciesielski and Charles Glenn Wheelus, Panama City, Fla., assignors to Arizona Chemical Company, New York, N.Y., a corporation of Delaware
No Drawing. Continuation-in-part of application Ser. No. 496,652, Oct. 15, 1965. This application Sept. 16, 1966, Ser. No. 579,850
8 Claims. (Cl. 260—97.6)

ABSTRACT OF THE DISCLOSURE

In the distillation of tall oil and tall oil fractions, with or without fractionation, improved color and stability are obtained by carrying out the distillation in the presence of catalytic amounts of a phenol sulfide of the formula

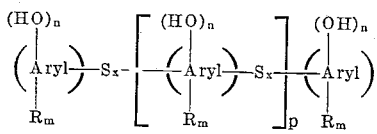

wherein aryl, R, and the subscripts $m$, $n$, $p$ and $x$ are as hereinafter defined.

---

This application is a continuation-in-part of Ser. No. 496,652, filed Oct. 15, 1965, now abandoned.

This invention relates to tall oil having improved color and color stability and to methods of distilling crude tall oil to provide these advantages in the tall oil and tall oil fractions.

Tall oil is widely used for the manufacture of alkyd coating compositions such as flat-wall alkyd paint, disinfectants, liquid soap products, rubber formulations including rubber foam and synthetic rubber latices, gloss oils, grease and metallic soaps, particularly tallate driers. Moreover, the fractional distillation products of tall oil, which are mixtures containing varying percentages of rosin acids and fatty acids together with minor amounts of unsaponifiable materials, are themselves valuable products for the manufacture of a host of materials for household and industrial use. Thus, tall oil rosin is employed in the manufacture of paper size, ester gums, synthetic resins, protective coatings, rubber polymerization and compounding, adhesives, printing ink vehicles, greases, foundry supplies, emulsifiers for disinfectants, insecticides, and other soap and chemical specialties. Tall oil fatty acids are useful in the manufacture of vinyl resin plasticizers, ink vehicles, sulfated fatty acids and esters for textile chemicals, ethoxylated esters, high quality industrial finishes, particularly light colored baking enamels, industrial soap products, emulsifiers and wetting agents, metallic driers and rubber compositions. In these and other numerous tall oil and tall oil fraction end uses, improved color, i.e., lighter color, and color stability are important and even critical.

It is known that crude tall oil may be bleached somewhat by heating at elevated temperatures before distillation or by treatment with sulfur, sulfur dioxide, iodine, and similar substances. However, these methods are relatively expensive since they require additional apparatus and steps after distillation of the crude tall oil. Moreover, although the color of the tall oil is improved, the stability is often unaffected and the tall oil tends to degrade to such a degree as to negative the bleaching effect.

An object of the present invention is to provide a method of bleaching and stabilizing tall oil during the distillation thereof without expensive apparatus and additional processing steps.

A further object is to provide a process for distilling crude tall oil which also results in improved color and stability of the product.

Another object is to provide distilled tall oil of improved color and stability.

These and other objects, features, and advantages of the invention will be further detailed in the description immediately following.

Accordingly, a method of bleaching and stabilizing tall oil has now been discovered which comprises distilling tall oil at an effective temperature in the presence of effective amounts of certain treating compounds or mixtures of two or more of such compounds.

By effecting amounts of the treating compound is meant minor or "catalytic" amounts, e.g., in the range of from about 0.01% to 1.0%, preferably 0.05% to 0.2%, by weight based on the weight of the tall oil.

The tall oil treated according to the invention may be previously distilled tall oil but preferably is the crude tall oil resulting from the acidulation of black liquor soap. The invention is practiced in connection with distillation of crude tall oil or fractional distillation of the distilled tall oil. As a distillation process, the procedure is conventional with the exception of the presence of the thiobisphenol additive. The cuts resulting from the fractional distillation are normally mixtures containing about 1–99% by weight of rosin acids, the balance being about 99–1% by weight fatty acids and minor amounts of unsaponifiable materials.

The treating agents may be represented by the general formula:

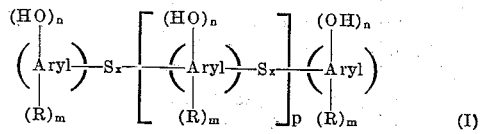
(I)

where $n$ is an integer from 1 to 3 inclusive, $p$ is an integer from 0 to 100 and preferably about 5 to 20 inclusive, and the sum of $m$ and $n$ on each aryl is between 1 and 5 inclusive, $x$ is 1, 2 or 3, and R is a hydrocarbon group, e.g., alkyl, cycloalkyl and substituted alkyl, e.g., $C_1$–$C_8$, wherein the substituents are cycloalkyl, aryl, alkaryl, and the like. R desirably contains from 1 to 22 carbon atoms inclusive. Preferred alkyl groups are straight chain secondary and tertiary alkyl groups containing up to 8 carbon atoms inclusive. Preferred aryl groups are those containing 6 to 18 carbon atoms, inclusive, typically phenyl, naphthyl and anthracyl. Typical cycloalkyl groups contain 3–8 carbon atoms in the ring, e.g., cyclopropyl, cyclopentyl and cyclohexyl.

In Formula I when aryl is phenol it will be apparent that when $p$ is 0 the sum of $m$ and $n$ on each phenyl ring will not be more than 5 and when $p$ is 1 or higher the sum of $m$ and $n$ on each phenyl ring will not be more than 4. It will also be apparent, however, that the sum of $n$ and $m$ may range higher when aryl is napthyl or anthracyl since when $p$ is 0 or at least 1 more than 5 or 4 sites, respectively, are available for OH and R substituents. The values for $m$, $n$, $x$ and $p$, except when 0, are positive, whole numbers, Included are compounds and position isomers having R groups of mixed character, i.e., the R group or groups on one aryl ring may differ from the R group or groups on the other aryl ring; $m$ and $n$ may be the same or different for each aryl ring; and when more than one R group is present on an aryl ring, such groups may be identical or different.

The term "treating agent" or "treating compound" or like term, is intended herein to mean compounds defined by Formula I above.

From the repeating unit of Formula I above it will be seen that the invention includes not only the use of thiobis compounds ($p$ equals 0) but also higher molecular weight materials, for example, where $p$ is 100 or more, provided sufficient sites are available for polymerization, e.g., the sum of $n$ and $m$ where aryl is phenyl does not exceed 4. The upper limit of molecular weight is dependent only upon how the compound is made, e.g., whether the material is sufficiently fluid in the reaction medium for polymerization to continue, and upon use conditions, e.g. whether the material can be effectively admixed or blended for good contact with the material to be bleached. Obviously, a polymer of such high molecular weight as to be unmanageably tacky or glassy is to be avoided in the practice of the invention. From the viewpoint of economy and ease of preparation and use according to the invention, preferred treating agents are those which are soluble in the material treated, e.g., compounds of Formula I wherein $p$ is in the range of 5 to about 20.

As typical and non-limiting examples of the treating agents may be mentioned:
Thiobis naphthols, e.g.,
1,1'-thiobis($\beta$-naphthol)
2,2'-thiobis($\alpha$-naphthol)
2,2'-thiobis phenols, e.g.,
2,2'-thiobis(4-methyl-6-tert.-butylphenol)
2,2'-thiobis(4,6-dimethylphenol)
2,2'-thiobis(4,6-di-tert.-butylphenol)
2,2'-thiobis(4-ethyl-6-tert.-butylphenol)
2,2'-thiobis(4-n-propyl-6-amylphenol)
2,2'-thiobis(4-methyl-6-n-octylphenol)
2,2'-thiobis(4-amyl-6-tert.-octylphenol)
2,2'-thiobis(4-methyl-6-n-decylphenol)
2,2'-thiobis(4-methyl-6-laurylphenol)
2,2'-thiobis[4-methyl-6-(1-methylcyclohexyl)phenol]
2,2'-thiobis[4-methyl-6-(1-methylbenzyl)phenol]
2,2'-thiobis(4-methylphenol)
2,2'-thiobis(6-tert.-butylphenol)
2,2'-thiobis(4,6-dilaurylphenol)
2,2'-thiobis(4,6-distearylphenol)
3,3'-thiobisphenols, e.g.,
3,3'-thiobis-[methyl-6-(1,1,3,3-tetramethylbutyl)phenol]
3,3'-thiobis-(methyl-6-t-dodecylphenol)
3,3'-thiobis(pentadecyl-t-butylphenol)
4,4'-thiobis phenols, e.g.,
4,4'-thiobis(3-methyl-6-tert.-butylphenol)
4,4'-thiobis[3-methyl-6-(1-methylcyclohexyl)phenol]
4,4'-thiobis(2-methyl-6-tert.-butylphenol)
4,4'-thiobis(3,6-dimethylphenol)
4,4'-thiobis(3,6-di-tert.-butylphenol)
4,4'-thiobis(3-ethyl-6-tert.-butylphenol)
4,4'-thiobis(3-n-propyl-6-amylphenol)
4,4'-thiobis(3-methyl-6-n-octylphenol)
4,4'-thiobis(3-amyl-6-tert.-octylphenol)
4,4'-thiobis(3-methyl-6-n-decylphenol)
4,4'-thiobis(3-methyl-6-laurylphenol)
4,4'-thiobis(3,6-dilaurylphenol)
4,4'-thiobis(3,6-distearylphenol)
4,4'-thiobis[3-methyl-6-(1-methylcyclohexyl)phenol]
4,4'-thiobis[3-methyl-6-(1-methylbenzyl)phenol]
4,4'-thiobis(2-tert.-butylphenol)
4,4'-thiobis[2-methyl-6-(1-methylcyclohexyl)phenol]
4,4'-thiobis[2-methyl-6-(1-methylbenzyl)phenol]
4,4'-thiobis(2-methyl-6-tert.-butylphenol)
4,4'-thiobis(2-tert.-butylphenol)
4,4'-thiobis(2-methyl-6-laurylphenol)
4,4'-thiobis(2,6-distearylphenol)
4,4'-thiobis[2,6-di($\alpha$-methylbenzyl)phenol]
4,4'-thiobis[2,6-di($\alpha,\alpha$-dimethylbenzyl)phenol]
4,4'-thiobis[3-($\alpha$-methylbenzyl)-6-($\alpha,\alpha$-dimethylbenzyl)phenol]
Thiobis-polyhydroxy compounds, e.g.,
4,4'-thiobis(resorcinol), 5,5'-thiobis(pyrogallol), the di- and trithiobis variants of any of the foregoing, and higher molecular weight materials corresponding to the repeating unit of any of the foregoing. These and other like compounds are disclosed, for example, in U.S. Patents 2,670,382, 2,670,383, 2,841,619, 3,060,121, 3,069,384, 3,157,517, 3,211,794 and Compt. rend. 198, 1791–3 (1934), said disclosures being incorporated herein by reference.

Particularly preferred are the polyhydroxy compounds such as 4,4'-thiobis(resorcinol) and 5,5'-thiobis(pyrogallol), the so-called "hindered" thiobisphenols, i.e., those wherein each aromatic ring is substituted by one hydroxy group, one bulky group, e.g., secondary or tertiary alkyl group, and one short straight chain ($C_1$–$C_8$) alkyl group, and higher molecular weight compounds wherein $p$ is in the range of 5 to 20. Typical of the "hindered" thiobisphenols are 2,2'-thiobis(4-methyl-6-tertiary-butylphenol); 4,4'-thiobis(6-tertiary butyl meta cresol); and 4,4'-thiobis-(6-tertiary butyl ortho cresol). Of the thiobisphenols, the first shows best results and it has been observed that as the sulfur atom is shifted away from a position ortho to the hydroxyl and the methyl group is shifted toward the ortho from the para position, bleaching efficiency decreases. Typical of the higher molecular weight compounds is poly[thio-(resorcinol)] wherein $p$ is 6 to 9.

As already indicated, the invention is practiced in conjunction with conventional distillation of crude tall oil or fractional distillation of distilled tall oil. In either of these situations, the tall oil may first be heated in the presence of the treating compound, followed by distillation, or at any step therein when the tall oil is temporarily maintained at elevated temperature.

Any conventional distillation procedure may be employed, such as steam, dry vacuum or molecular distillation. Of these, steam distillation is preferred since it permits higher temperature and pressure without degradiation of the tall oil. Conditions for steam distillation may vary depending on choice of pressure and temperature. Preferred conditions are about 250–275° C. at vacuum or about 50–100 mm. pressure until a desired steam/oil ratio has been achieved or until distillation is substantially complete. The steam distillation may be immediately followed, if desired, by fractional distillation, again under conventional conditions. Preferred conditions for fractional distillation are a vapor temperature of about 170–230° C. and pressure of about 4 mm. until fractionation is substantially complete.

Any of the procedures described above may be batch, semi-continuous or continuous and sequence of addition is not critical. Thus, the tall oil may be heated somewhat before addition of the treating agent or the treating compound may be added initially followed by distillation of the mixture.

The bleaching and color stabilizing effect of the invention is a surprising result since it would not be expected that the treating agents, many of which are known antioxidants, would during distillation bleach tall oil as well as stabilize the resulting lighter colored products against degradation and coloration. While the reasons for this behavior are not fully understood, it is believed that the bleaching occurs by the transformation of color bodies in the tall oil.

The method of the invention has the advantage of producing rosin acid and fatty acid fractions, each exhibiting improved color and color stability, without resorting to treatment of the individual fractions after distillation. Bleaching and stabilization of the individual fractions of the tall oil by simple heating with the treating agents is the subject of copending patent applications, each of which is incorporated herein by reference, Ser. Nos. 579,819 and 579,851 each filed Sept. 16, 1966.

The following examples further illustrate the invention but are not limitative thereof except as indicated in the appended claims. All parts and percentages are by weight unless otherwise specified.

EXAMPLES 1-3

The following describes a typical procedure for bleaching of crude tall oil according to the invention.

To the reaction vessel of a conventional steam distillation apparatus was charged crude tall oil and TBP, i.e., 2,2′-thiobis(4-methyl - 6-t-butylphenol), in the amounts shown. The mixture was then heated at about 250–275° C. and about 50 mm. and steam-distilled until distillation was essentially complete. Table I shows the effect of the thiobisphenol additive on distillate color and stability of the color as compared with a control. Color stability was tested by heating the sample in air at 110° C. (oven) for 1 hour. The colors shown are based on Gardner 1933 standards in which the colors are lighter as the numbers decrease in magnitude. Thus a color of 12 is reddish, 9 is orange-red, 6 is tea-colored, and 1 is pale yellow. Commercial quality tall oil generally requires color in the 6 to 1 range. The data shows a 3-point color reduction (9+ to 6−), thus providing commercial quality tall oil without substantial expense of subsequent heating or other treatment. It will also be noted that the stability in each example was better than that of the control. Best stability is achieved when at least about 0.1% of the thiobisphenol is employed.

TABLE I

| Example | Percent TBP | Distillate Color | Distillate Color Stability |
|---|---|---|---|
| Control | | 9+ | 12− |
| 1 | 0.1 | 6− | 9+ |
| 2 | 0.05 | 7+ | 11+ |
| 3 | 0.01 | 7+ | 11+ |

EXAMPLE 4

Tall oil, steam-distilled from the crude in a conventional manner, was fractionally distilled, employing conventional fractional distillation apparatus and procedure (about 170–230° C. at 4 mm.) except for the presence of 0.1% of the same thiobisphenol (TBP) as utilized in Examples 1–3. The results are shown in Table II. As compared with the control, each fraction except the first was lighter in color. Fractions 1–5 represent mixtures of rosin and fatty acids which predominate in the latter (about 50% or more). The numerical color grades are based on Gardner 1933 standards and the letter color grades are based on U.S.D.A. standards (N and WG being 1 and 2 points lighter, respectively, than M).

TABLE II

| Fractions | Distilled Tall Oil Controls | | Distilled Tall Oil Containing 0.1% TBP | |
|---|---|---|---|---|
| | Percent of Charge | Color | Percent of Charge | Color |
| 1 | 3 0 | 11+ | 2.9 | 11+ |
| 2 | 4.3 | 9+ | 3.9 | 8+ |
| 3 | 15.3 | 4− | 15.0 | 3+ |
| 4 | 15.3 | 2+ | 15.2 | 1+ |
| 5 | 12.3 | 4− | 15.8 | 2+ |
| Column Holdup | 6 1 | | 6.3 | |
| Residue (Rosin) | 42.9 | M | 41.9 | N–WG |

EXAMPLE 5

Essentially as described in Examples 1–4, tall oil samples are distilled in separate experiments in the presence of 0.1% by weight of 4,4′-thiobis(resorcinol), 1,1′-thiobis(β-naphthol) and a poly[thio(resorcinol)] compound of Formula I above wherein $p$ is 8 to provide tall oil of substantially lighter color and color stability.

Substantially the same improvement is achieved when fractionally distilling tall oil in the presence of the treating agents.

We claim:

1. In the distillation of tall oil by vaporizing it at distillation temperatures within the range of about 250–275° C. at about 50–100 mm. pressure followed by condensation, the method of obtaining a condensate of improved color and stability which comprises carrying out the vaporization step in the presence of about 0.01% to 1% by weight of a treating compound of the formula:

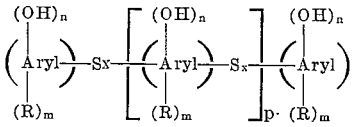

wherein $n$ is an integer from 1 to 3, $p$ is an integer from 0 to 100, $x$ is 1 to 3, the sum of $m$ and $n$ on each aryl is from 1 to 5, aryl is selected from the group consisting of phenyl, naphthyl and anthracyl, and R is a hydrocarbon radical of 1 to 22 carbon atoms.

2. The method of claim 1 wherein said treating compound is 2,2′-thiobis(4-methyl-6-t-butylphenol).

3. The method of claim 1 wherein said treating compound is 4,4′-thiobis(resorcinol).

4. The method of claim 1 wherein said treating compound is poly[thio(resorcinol)] wherein $p$ is in the range of 5 to 20.

5. The bleached and stabilized tall oil resulting from the method of claim 1.

6. The method of claim 1 wherein the tall oil is crude tall oil and said crude tall oil is steam distilled in the presence of said treating agent.

7. The method of claim 6 wherein said tall oil is distilled tall oil.

8. In the distillation of tall oil by vaporizing it and fractionating the vapors at vapor temperatures of about 170–230° C. and pressures of about 4 mm., the method of obtaining a condensate of improved color and stability which comprises carrying out the fractionation step in the presence of about 0.01% to 1% by weight of a treating agent of the formula:

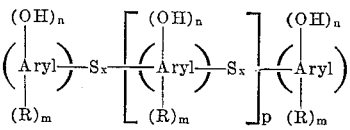

wherein $n$ is an integer from 1 to 3, $p$ is an integer from 0 to 100, $x$ is 1 to 3, the sum of $m$ and $n$ on each aryl is from 1 to 5, aryl is selected from the group consisting of phenyl, naphthyl and anthracyl, and R is a hydrocarbon radical of 1 to 22 carbon atoms.

References Cited

UNITED STATES PATENTS

| 3,157,517 | 11/1964 | Tholstrup et al. | 99—163 |
| 3,211,794 | 12/1965 | Coffield | 260—609 |
| 3,253,042 | 5/1966 | Worrel | 260—608 |
| 3,281,473 | 10/1966 | O'Shea | 260—609 |

FOREIGN PATENTS

| 294,526 | 9/1929 | Great Britain. |
| 512,304 | 4/1955 | Canada. |

DONALD E. CZAJA, *Primary Examiner.*

F. McKELVEY, *Assistant Examiner.*